Nov. 15, 1938.  T. E. ADAMS  2,136,929
INFLATING AND CLOSURE MEANS FOR PNEUMATIC TIRES
Filed March 18, 1938
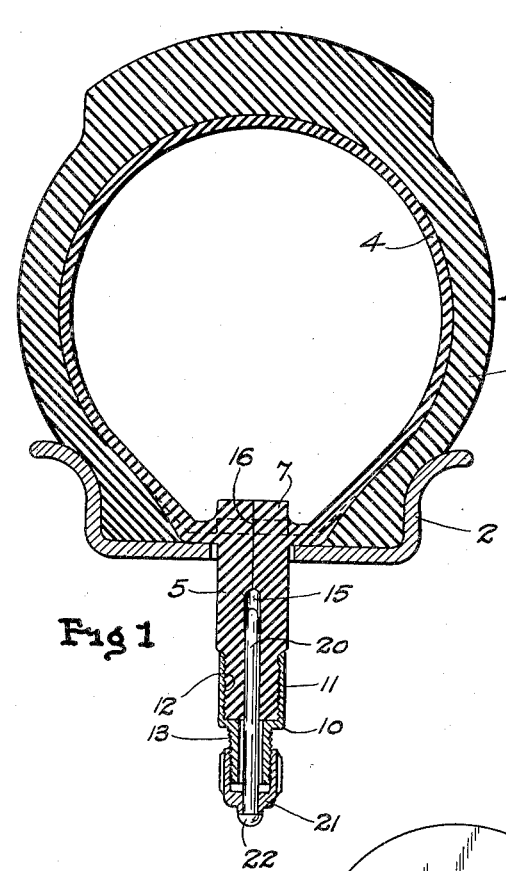
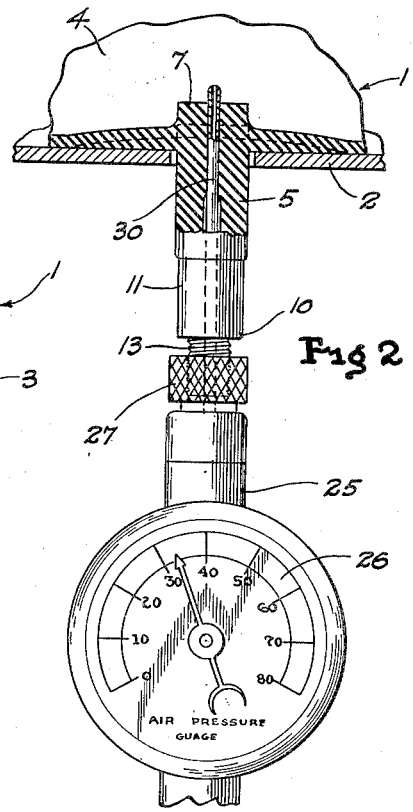
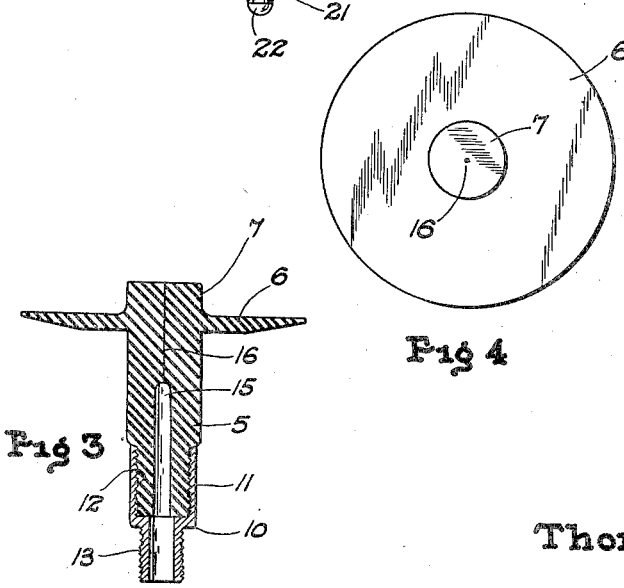
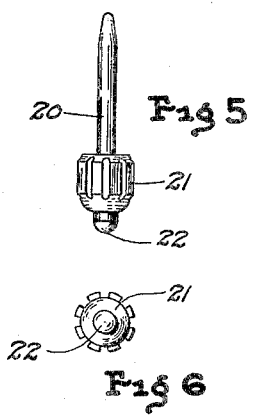
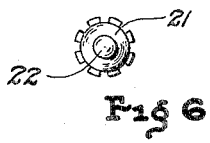
Thomas E. Adams
INVENTOR
BY Hull. Brock & West
ATTORNEYS Patented Nov. 15, 1938

2,136,929

UNITED STATES PATENT OFFICE 2,136,929

INFLATING AND CLOSURE MEANS FOR PNEUMATIC TIRES

Thomas E. Adams, Angola, N. Y.

Application March 18, 1938, Serial No. 196,672

7 Claims. (Cl. 152—415)

This invention relates to pneumatic tires, and more particularly to inflating and closure means therefor.

The fundamental purpose of the invention is to simplify, cheapen, and at the same time improve the inflating and closure means of pneumatic tires, thereby to do away with the intricate and comparatively expensive and delicate valve mechanism employed at the present time in the stems of such tires, and which is relatively short lived and therefore has to be replaced frequently.

Another object is to provide inflating and closure means for pneumatic tires that is very durable and, due to its simplicity, practically immune from disorder.

A more limited object is the production of a tubular rubber valve stem for attachment to the inner tubes of pneumatic tires, desirably by vulcanization according to prevailing methods of manufacture, this means of attachment insuring against leakage at the joint; and which stem is characterized by a part of its bore, as the inner end portion thereof, being restricted to a capillary and substantially self-closing duct so as to practically shut off the flow of air therethrough and thus temporarily hold the desired air pressure in the tire immediately after inflation, and wherewith a plug or stopper is associated for tight insertion into an unrestricted part of the bore, as the outer end portion thereof, to completely close the same and thus positively prevent leakage through the stem for a practically unlimited period of time.

Another object is to provide means constricting the stem in the region of the plug or stopper so as to minimize the possibility of ultimate enlargement of the bore by a permanent outward displacement of the rubber by the plug or stopper.

A further object is to provide inflating means for use with a self-closing stem of the above character comprising a slender tube of suitable length to which the terminal fitting of the air hose may be applied, and which tube is insertable through the stem to a point beyond the restricted part of the bore so as to establish free communication between the hose and the interior of the inner tube, this arrangement also providing facilities for releasing air from the tire and for taking pressure readings by means of a tire gauge, desirably of the type incorporated in the air hose fitting.

The foregoing objects and advantages, with others hereinafter appearing, are attained in the embodiment of the invention illustrated in the accompanying drawing wherein Fig. 1 is a transverse section through a pneumatic tire incorporating the invention, the tire being shown as mounted on a rim; Fig. 2 is a view at right angles to Fig. 1, showing a part of the stem and the adjacent portion of the tire and rim in section, the view including the equipment by which the tire is adapted to be inflated and the pressure readings taken; Fig. 3 is a central longitudinal section through the valve stem before its attachment to an inner tube; Fig. 4 is a plan view of the same, and Figs. 5 and 6 are a side elevation and an end view, respectively, of the plug or stopper.

The tire, as a whole, is designated generally by the reference numeral 1, and it is shown as mounted on a rim 2. The tire may comprise the usual casing 3 and an inner tube 4, and where the term "pneumatic tire" is used herein it is to be understood as embracing any equivalent of the illustrated structure.

The stem 5, which is of rubber having the proper degree of elasticity, is formed with a base 6, shown as circular and as concentric with the stem. A boss 7, which is, in effect, a continuation of the stem, projects from the side of the base opposite the stem proper. Applied to the outer end of the stem, as by molding the stem therein, is a tubular metal fitting 10. The enlarged inner end portion 11 that receives the stem has a roughened interior surface, as indicated at 12, produced as by threading the same or forming annular ridges thereon, thereby to hold the fitting immovably upon the stem. The outer end portion of the fitting is reduced in diameter and is externally threaded, as indicated at 13.

The stem 5 is provided with a bore 15 that opens through the outer end of the stem in register with the bore of the fitting 10 and is shown as of a length somewhat more than half that of the stem. Extending from the inner end of the bore 15 throughout the remainder of the length of the stem and opening through the circular face of the boss 7 is a capillary duct 16 which may be produced in any suitable manner, as by inserting a needle-like instrument through the bore 15 and penetrating the inner end portion of the stem. It is apparent, therefore, that the duct is self-sealing, or practically so.

The inner tube is formed with a hole to receive the boss 7 and is adapted to be engaged thereabout by the base 6, the parts being vulcanized to effect an integral structure, this being indicated in Figs. 1 and 2 by the fact that the tube and stem are cross hatched alike. The original plane of separation between the two is suggested by dotted lines.

The bore of the stem may be effectively closed by a plug or stopper 20 in the form of a pin that is shown as tapered slightly adjacent its entering end and whose diameter throughout the major portion of its length is somewhat greater than the normal diameter of the bore 15. Secured to the outer end of the plug is a cap 21 of similar size and appearance to that of the cap of the standard tire stem. As the parts are illustrated, the outer end of the plug has a pressed fit within an axial aperture in the outer end of the cap and, when the plug is forced into the aperture until its outer end is flush with the corresponding end of the cap, a deposit of solder or like material may be applied to the end of the cap and the exposed portion of the plug, as indicated at 22.

When it is desired to inflate the tire, the cap 21 is removed from the threaded outer end of the fitting 10 and the plug or stopper 20 withdrawn from the bore of the valve stem. The inflating equipment, shown in Fig. 2, comprises a hose fitting 25 incorporating a pressure gauge 26. The inner end of the fitting is adapted to be applied to the valve stem and may include a knurled coupling 27, desirably swiveled to the end of the fitting and adapted to be screwed onto the threaded outer end of the fitting 10. Extending from the fitting 25 in concentric relation to the coupling 27 is a slender tube 30 arranged to be projected through the bore of the fitting 10 into the bore of the stem 5 and finally forcibly through the capillary self-closing duct 16 of the stem. The tube 30 is of a length to project slightly beyond the inner end of the boss 7 when the coupling 27 is applied to the fitting 10. The inflating equipment, with the exception of the tube 30, may be of any prevailing type suited to the purpose, desirably of the sort that includes a pressure gauge and means for shutting off the flow of air to the tire at will and at the same time subjecting the gauge to the air pressure within the tire, this usually being accomplished by a valve operating trigger (not shown). By proper manipulation of the inflating equipment, air may be injected into and released from the tire until the desired pressure, indicated by the gauge 26, is obtained; and when this has been accomplished the coupling 27 is unscrewed from the fitting 10 and the tube 30 is withdrawn from the stem 5, the duct 16 closing from the inner end as the tube is withdrawn. By the self-closing action of the duct the air pressure in the tire is held substantially fixed for ample time to enable the operator to insert the plug 20 and thus positively seal the bore of the stem. The plug is forced home within the bore of the stem by the screwing down of the cap 21 on the threaded end of the fitting 10, and by reason of the fact that the outer end of the stem is confined within the end portion 11 of the fitting 10, the rubber of the stem throughout this region is constrained against outward displacement. As a consequence there is little likelihood of the bore 15 ultimately becoming so enlarged that the plug or stopper would not effectively close the same. In such an eventuality, however, the plug or stopper may be dipped into a suitable adhesive before being inserted into the stem which will insure sealing of the bore 15 until the plug or stopper is again removed for the purpose of inflating the tire.

Having thus described my invention, what I claim is:

1. In combination, a pneumatic tire, a stem of elastic material carried thereby, said stem having a bore throughout a substantial portion of its length opening through its outer end and a capillary duct extending from the bore through the inner end of the stem, a fitting secured to and surrounding the outer end portion of the stem, a plug insertable into the bore of the stem and of a length to occupy the latter for a substantial portion of its depth and being of a diameter to tightly fit the bore, and a cap secured to the outer end of the plug for application to the fitting.

2. In combination, a pneumatic tire, a stem of elastic material carried thereby, said stem having a bore throughout a substantial portion of its length opening through its outer end and a capillary duct extending from the bore through the inner end of the stem, a fitting secured to and surrounding the outer end portion of the stem and having a part projecting beyond said end where it is provided with a bore that registers with the bore of the stem, a plug insertable through the bore of the fitting into the bore of the stem and of a length to occupy the latter for a substantial portion of its depth, the plug being of a diameter to tightly fit the bore of the stem, the outer end of the fitting being externally threaded, and an internally threaded cap secured to the outer end of the plug for application to the threaded end of the fitting.

3. In combination, a pneumatic tire, a stem of elastic material carried thereby, said stem having a bore throughout a substantial portion of its length opening through its outer end and a self-closing capillary duct extending from the bore through the inner end of the stem, a tubular fitting having its inner end portion internally roughened and surrounding and permanently attached to the outer end portion of the stem, the outer end portion of the fitting being of reduced diameter and externally threaded, the bore of the latter portion registering with and being of somewhat greater diameter than the bore of the stem, a plug having a tapered end adapted to be projected through the bore of the fitting and for a substantial depth into the bore of the stem and tightly fitting the same, an internally threaded cap for application to the outer end of the fitting and to which the outer end of a plug is secured.

4. In combination, a pneumatic tire, a stem of elastic material carried thereby and extending through the plane of the tire wall so that its inner end is disposed inwardly of said wall, the stem having a bore throughout a substantial portion of its length opening through its outer end and a capillary duct extending from the bore through the inner end of the stem, and a plug for insertion within the bore of the stem and of a size and length to tightly fit the same to a substantial depth.

5. In combination, a pneumatic tire, a stem of elastic material carried thereby and extending through the plane of the tire wall so that its inner end is spaced inwardly of said wall, the stem having a bore throughout a substantial portion of its length opening through its outer end and a capillary duct extending from the bore through the inner end of the stem, a fitting surrounding and secured to the outer end portion of the stem, a plug for insertion within the bore of the stem and of a size to tightly fit the same, and means carried by the outer end of the plug for holding engagement with the fitting.

6. A tire stem comprising an elongated body and a base surrounding the body in spaced relation to the inner end thereof, the stem having a bore throughout a substantial portion of its length opening through its outer end and a capillary duct extending from the bore through the inner end of the stem, a fitting surrounding and secured to the outer end portion of the stem and terminating beyond such end in an externally threaded tubular portion, an internally threaded cap for application to said portion of the fitting, and a plug carried by the cap for insertion through the outer end of the fitting into the bore of the stem, the plug being of a length to occupy said bore to a substantial depth and of a diameter to tightly fit the same.

7. In combination, a pneumatic tire, a stem of elastic material carried thereby, said stem having a bore throughout a substantial portion of its length opening through its outer end and a capillary duct extending from the bore through the inner end of the stem, a fitting secured to and surrounding the outer end portion of the stem, a plug insertable into the bore of the stem and of a length to occupy the latter for a substantial portion of its depth and being of a diameter to tightly fit the bore, and a cap associated with the plug for application to the fitting.

THOMAS E. ADAMS.